(No Model.)

G. BRENNER.
Car Brake.

No. 238,211. Patented March 1, 1881.

Witnesses:
Jas. E. Hutchinson
Henry C. Hazard

Inventor:
Godfrey Brenner,
by A. B. Smith,
Attorney.

UNITED STATES PATENT OFFICE.

GODFREY BRENNER, OF POUGHKEEPSIE, NEW YORK.

CAR-BRAKE.

SPECIFICATION forming part of Letters Patent No. 238,211, dated March 1, 1881.

Application filed January 11, 1881. (No model.)

*To all whom it may concern:*

Be it known that I, GODFREY BRENNER, of the city of Poughkeepsie, county of Dutchess, and State of New York, have invented certain new and useful Improvements in Car-Brakes, of which the following is a specification.

The invention relates to that class of car-brakes in which the momentum of a moving train is applied as a force to set the brakes.
This is accomplished by means of a toothed wheel secured upon a wheel or axle of a car, meshing with another toothed wheel secured upon a drum or windlass which winds up a chain or cord connected with the brake-operating levers.

The details of construction and operation will be hereinafter more fully described in connection with the accompanying drawings, and the invention therein set forth in the claims.

Figure 1:
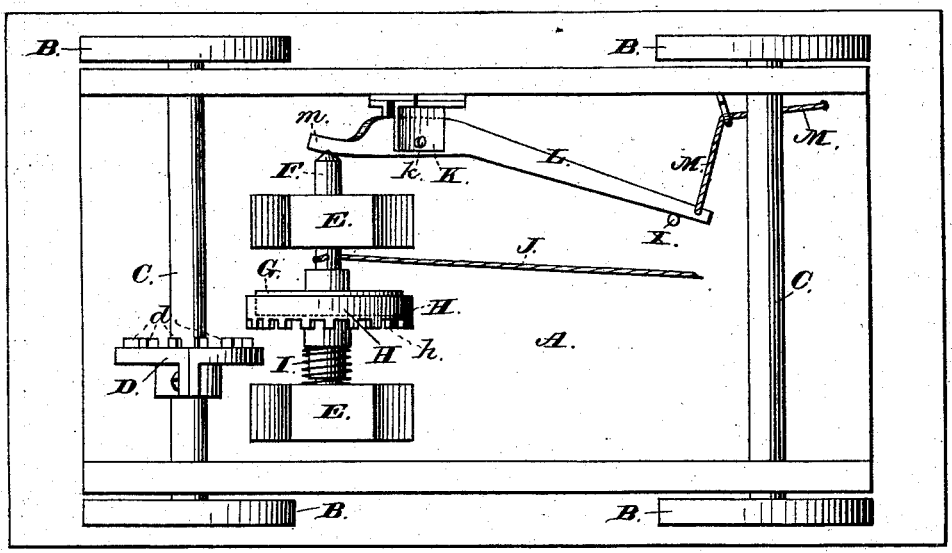
Figure 2:
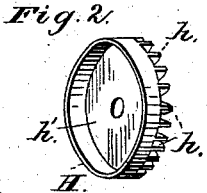
Figure 3:
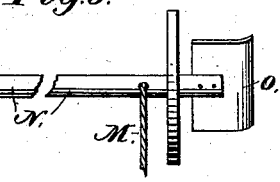
Figure 4:
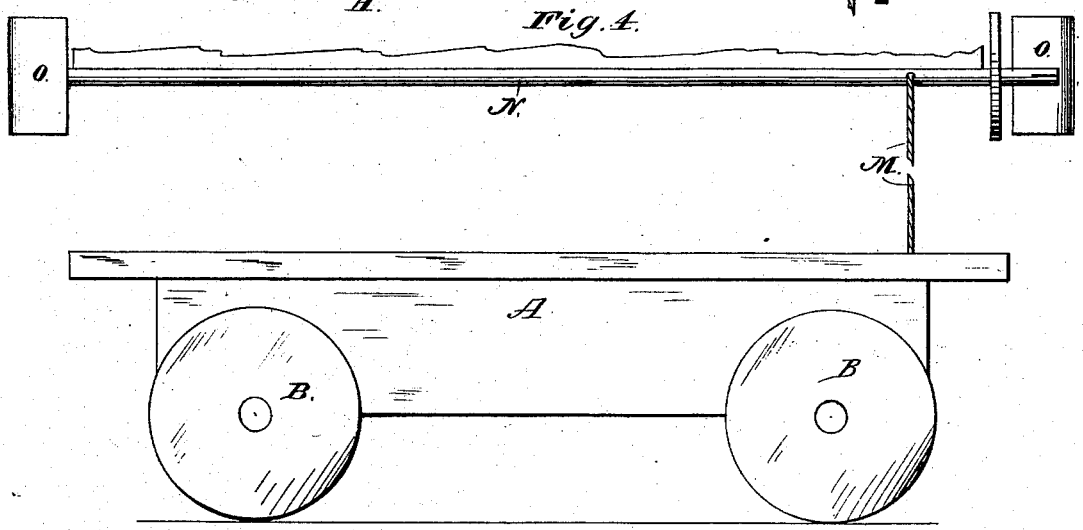

In the drawings, Figure 1 is a bottom-plan view of a car-truck having the invention applied thereto. Fig. 2 is a detached view of the toothed and friction wheels. Fig. 3 is a detached view of a rod or shaft which may be secured upon the car in any convenient place, either within or without the car, for the purpose of bringing the operative parts of the brake mechanism into operation when it is desired to set the brakes. Fig. 4 is a side view of the car, showing the operation of my car-brake by the rod or shaft connection.

A represents a truck-frame or car, B the wheels, and C the axles, all of which may be of any ordinary or usual construction.

Upon one of the axles is secured, by a key or other equivalent means, a wheel, D, having teeth of an oval or curved form at regular intervals upon the side or face thereof.

In hangers E E is journaled a shaft, F, having an endwise movement sufficient to allow the toothed wheels to be thrown into and out of gear.

A disk, G, is rigidly secured upon the shaft F, and arranged so that it may turn freely thereon is a toothed wheel, H, having teeth h upon its face side, and recessed, as shown at h', upon its inner side, into which recess the disk G fits with sufficient exactness to cause the shaft F to revolve by frictional contact when pressed against the wheel H, while the latter is in gear with and receiving motion from the wheel D upon the axle.

A spiral spring, I, is placed around the shaft F, and bears against the hub of the wheel H, and keeps it out of gear when the brake mechanism is not in operation.

A brake chain or cord, J, is secured to the shaft F, and is wound upon the same when the shaft is revolved. This chain or cord is secured at its other end to a lever system for operating the brakes.

The brakes, being of any ordinary or well-known construction, are not shown in the drawings, and need no particular description.

K is a bracket fastened upon any convenient part of the truck-frame or car, and upon it is pivoted the lever L by pivot-bolt k, and a stop-pin, X, limits the movement of the lever.

To the end of the lever L is fastened the cord or chain M, which is carried to the continuous shaft N, and the lever is operated by the cord being wound thereon; or it may be carried to a rope or chain running lengthwise of the train and operated by pulling the latter; or the rope or chain M may be carried to the platform and attached to the brake staff or lever thereon, which may be of the ordinary construction, not needing any illustration or description.

When it is desired to set the brakes the lever L is moved, in the manner described, so as to press its shorter arm against the end of the shaft F, which throws the toothed wheels into gear, thereby winding the brake-chain J upon the shaft and setting the brakes. By means of the friction-disk G any amount of pressure may be applied to the brakes without overstraining any of the parts or causing breakage by too sudden a movement.

Instead of a brake-staff upon each car, a continuous rod may be used, extending the entire length of the train, and which may be operated at one point—as from the engine, caboose, or baggage-car—and from it connections made with the cords or chains M to each of the levers L upon the several cars in the train, thus making a train-brake. For this purpose shaft N may be journaled upon the side, top, or bottom of the car in any convenient manner, and upon this shaft may be wound the cord or chain M, which operates the lever L.

Upon the ends of shaft N are attached flat plates O, which are slightly curved at the outer ends, so that they may readily pass each other as the cars are coupled together. When the cars of a train are coupled together these plates will lie side by side, and answer as a convenient coupling to transmit motion from one section of the shaft to another by turning the shaft at any point, as will be readily understood, and at the same time the plates will slide upon each other, so as to allow the usual play between the cars, and still retain connection with each other; or the cord attached to the long arm of the lever L may be passed into the top or any convenient part of the car and attached to a cord or chain passing through the entire train, and all the car-brakes be operated by pulling such continuous cord or chain.

Having thus described my invention, what I claim, and desire to secure by Letters Patent, is—

1. The toothed wheel D, secured upon the axle, in combination with the longitudinally-sliding shaft F, the toothed wheel H, friction-disk G, and brake-chain J, substantially as described.

2. In a car-brake mechanism, the toothed wheel secured upon the car-axle, in combination with the longitudinally-sliding shaft having the friction-disk secured thereon, the loose toothed wheel, spiral spring, the brake-chain, and the operating-lever, all substantially as described.

3. In a car-brake mechanism, and in combination therewith, the revolving shaft N, having the flat-plate couplings O, substantially as described.

GODFREY BRENNER.

Witnesses:
HENRY BOOTH,
FREDRICK W. PUGSLEY.